United States Patent [19]
Langton

[11] Patent Number: 4,988,908
[45] Date of Patent: Jan. 29, 1991

[54] PIEZOELECTRIC TRANSDUCERS FOR A RING LASER GYROSCOPE DITHER MOTOR

[75] Inventor: Richard G. Langton, Shoreview, Minn.

[73] Assignee: Honeywell Inc., Minneapolis, Minn.

[21] Appl. No.: 359,807

[22] Filed: May 31, 1989

[51] Int. Cl.⁵ .............................................. H01L 41/08
[52] U.S. Cl. ..................................... 310/331; 356/350
[58] Field of Search ................ 310/321, 323, 330–332; 356/350

[56] References Cited

U.S. PATENT DOCUMENTS

| | | | |
|---|---|---|---|
| 3,304,773 | 2/1967 | Rogallo | 310/331 X |
| 3,748,503 | 7/1973 | Cobarg et al. | 310/331 |
| 3,760,203 | 9/1973 | Guntersdorfer et al. | 310/331 X |
| 4,113,387 | 9/1978 | Shutt | 310/332 X |
| 4,370,583 | 1/1983 | Ljung | 310/331 |
| 4,406,965 | 9/1983 | Ljung | 310/330 X |

FOREIGN PATENT DOCUMENTS 0214414 9/1987 Japan ..................... 310/331

Primary Examiner—Mark O. Budd
Attorney, Agent, or Firm—Robert A. Pajak

[57] ABSTRACT

The present invention is to provide an arrangement of piezoelectric transducers attached to a dither spring spoke which allows for both flexing a dither spring spoke and sensing the flexure of the same dither spring spoke.

2 Claims, 1 Drawing Sheet

PIEZOELECTRIC TRANSDUCERS FOR A RING LASER GYROSCOPE DITHER MOTOR

BACKGROUND OF THE INVENTION

The present invention relates to a ring laser gyroscope. More particularly, it relates to an arrangement of piezoelectric transducers for driving a dither spring, and for sensing the flexure of the dither spring commonly used in dither motors for ring laser gyroscopes.

Piezoelectric dither motors are commonly used for the purpose of dithering laser gyro blocks. Typically, a dither motor is comprised of one or more piezoelectric transducers (PZTs) attached to a dither spring as shown and described in U.S. Pat. No. 4,370,583 issued to Ljung. The dither spring is generally composed of a central member or hub having a plurality of flexible radial members or spokes extending between the central member and a toroidal rim.

In the aforementioned patent, a single piezoelectric element is comprised of upper and lower surfaces. One surface electrode is provided on the lower surface of the piezoelectric element. Two other surface electrodes are attached to the piezoelectric element at opposite ends of the upper surface of the piezoelectric element. The two upper electrodes are separated by a gap which is at the midpoint of the piezoelectric element. The piezoelectric element with the two electrodes is rigidly attached to a spoke such that the gap between the electrodes is in juxtaposition with the the point of inflection of the radial member. The lower electrode surface and the adjacent lower surface of the piezoelectric element is attached to a spoke by an insulating epoxy. The piezoelectric element is positioned on the spoke such that its midpoint corresponds to the point of inflection or a point of neutral radius of the spoke. At the point of inflection, when the spoke is flexed, the spoke is negligibly deviated from its rest position.

With the piezoelectric element of Ljung described above, a voltage is applied across the upper surface electrodes causing the PZT to deform and flex the spoke. By application of a generally sinusoidal voltage, a push-pull effect of the PZT on the spoke is achieved. This combined push-pull/flexing effect oscillates the rim relative to the hub. Generally, the dither spring is mounted to a laser gyro block to cause rotational oscillations of the block relative to an inertial platform.

Further, as shown and described in U.S. Pat. No. 4,406,965 issued to Ljung, a separate and non-driven pickoff PZT, constructed in a manner as already described with reference to U.S. Pat. No. 4,370,583, may be attached to one of the spokes for sensing dither rotation. In these circumstances, the two surface electrodes mounted on the upper surface of the piezoelectric element are electrically connected to a detection circuit to provide an output signal related to the amount of flexure of the spoke. The amount of flexure of the spoke is of course indicative of the magnitude of the rotation of the rim relative to the central member.

The output of the detection circuit is sometimes referred to as the "dither pick-off signal" As is well known in the art, the pickoff signal may be used as part of a closed-loop control circuit for oscillating the spring-mass system of the gyroblock and the dither motor at resonance. Also, the dither pickoff is commonly used for "dither signal stripping" schemes which remove the dither rotation component from the usual readout rotation signal.

In the aforementioned prior art dithering scheme, the arrangement of the PZT electrodes can lead to undesired crosstalk which degrades the performance of the dither motor and also contributes to errors in the pickoff signal. Further, as gyro size decreases, dither motor size typically decreases. Hence, in smaller dither motors, the area of the gap between electrodes correspondingly decreases which increases the possibility of crosstalk.

Further, in the prior art, the employment of a pickoff PZT on a spoke, particularly as described in the above referred to patents, precluded the employment of a driving PZT on the same spoke as the sensing PZT. This is particularly illustrated and described in the aforementioned Ljung patents.

SUMMARY OF THE INVENTION

An object of the present invention is to provide an arrangement of piezoelectric transducers attached to a dither spring spoke which allows for both flexing a dither spring spoke and sensing the flexure of the same dither spring spoke.

DETAILED DESCRIPTION OF THE INVENTION

Figure 1:
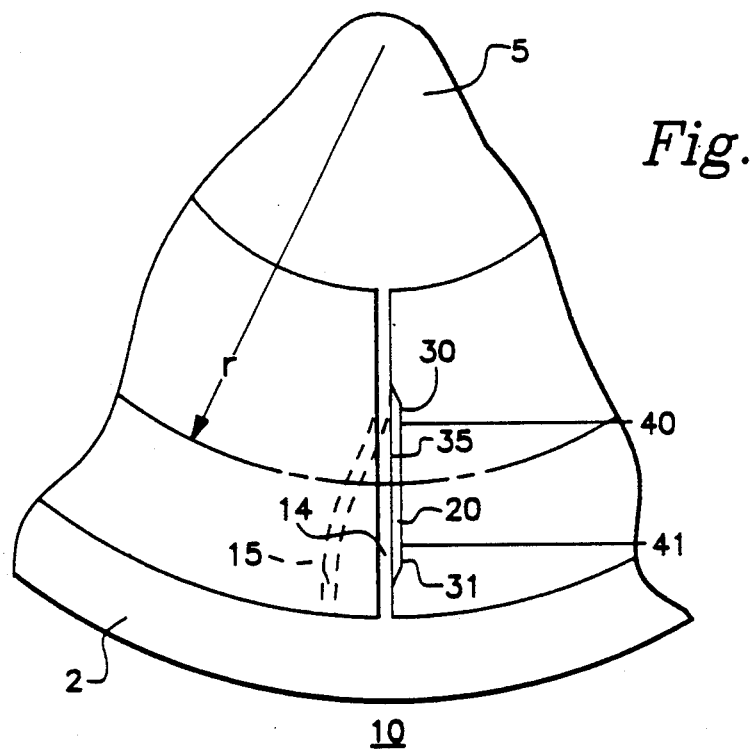
FIG. 1 is a fragmentary schematic diagram of a prior art dither motor.

FIG. 1 illustrates a portion of a dither motor described in U.S. Pat. No. 4,370,583 issued to Ljung. Therein, a dither spring 10 is comprised of a central member 5, a toroidal rim 2, and flexible radial members 14 (one shown). A piezoelectric element 20 is comprised of an upper surface having planar electrodes 30 and 31, and a lower surface having a planar electrode 35. Piezoelectric element 20 is rigidly fixed to radial member 14 by means of an insulating epoxy such that electrode 35 is electrically isolated from radial member 14, i.e. electrically not in common with with radial member 14. This arrangement of piezoelectric element 20 and radial member 14 is employed on a plurality of dither motor radial members as is well understood in the art.

In accordance with the teachings of Ljung, PZT 20 is attached to radial member 14 such that the center point of PZT 20 is at the indicated radius "r" with electrodes 30 and 31 being on opposite sides of the PZT 20 upper surface center point. Radius "r" is defined as the radius where radial member 14 has a zero bending moment due to a rotation of rim 2. Otherwise stated, radius "r" is located at the inflection point of radial member 14.

Electrodes 30 and 31 are intended to be electrically connected across an electric potential source to flex the radial spring member. For example, a sinusoidal voltage may be applied to electrodes 30 and 31 via leads 40 and 41, respectively. This voltage impressed across electrodes 30 and 31 results in a deformation of PZT 20. This deformation of PZT 20 provides a corresponding flexing of radial member 14 to a position indicated by 15 in FIG. 1. In turn, this flexing action causes rim 2 to rotate relative to member 5.

Alternatively electrodes 30 and 31 may be electrically connected to a detection circuit for detecting the amount of flexure of the radial spring member as particularly taught in U.S. Pat. No. 4,406,965, also issued to Ljung.

Figure 2:
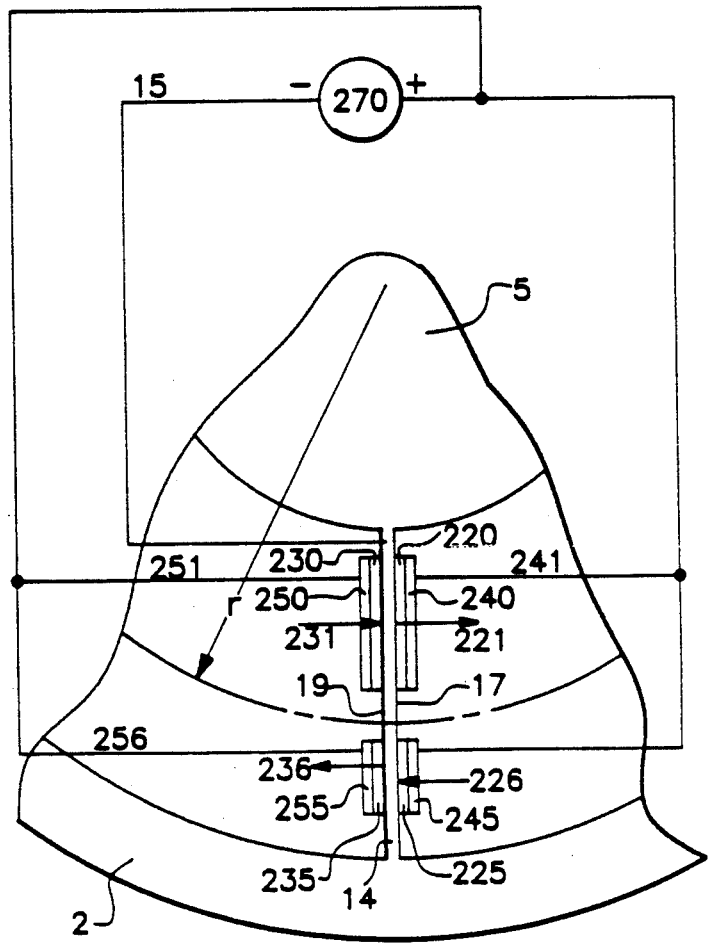
FIG. 2 is a fragmentary schematic diagram of the present invention.

FIG. 2 illustrates an arrangement of a plurality of piezoelectric elements in accordance with the present invention. In FIG. 2, components having the same intended function as those in FIG. 1 have the same numeral designations as FIG. 1.

In FIG. 2, PZTs 220, 225, 230, and 235, are attached to radial member 14 by an electrically conductive boding agent. The lower surfaces of PZTs 220 and 225 are fixed to surface 17 of radial member 14 on opposite sides of the point of inflection of radial member 14 defined by radius "r". The lower surfaces of PZTs 230 and 235 are fixed to surface 19 of radial member 14 also on opposite sides of the point of inflection defined by radius "r". Further, as illustrated in the drawing, PZT 220 is positioned opposite PZT 230, and PZT 225 is positioned opposite PZT 235.

At the upper surface of each PZT 220, 225, 230 and 235 is a surface electrode 240, 245, 250, and 255 respectively. Radial member 14 serves as a surface electrode to the lower surface of each PZT 220, 225, 230 and 235. Alternatively, the lower surface of each of the PZTs could also be provided a surface electrode.

PZT 220 possesses a polarization polarity which is the opposite of the polarization polarity of PZT 225 as indicated by polarization reference arrows 221 and 226, respectively. PZT 230 posses a polarization polarity which is the opposite of the polarization polarity of PZT 235 as indicated by polarization reference arrows 231 and 236, respectively. Further, the polarization polarity of PZT 220 is same as the polarization polarity of PZT 230.

In the present application, radial member 14, electrically in common with the lower surface of each of PZTs 220, 225, 230, and 235, is electrically connected to one side of an electric potential source 270 via lead 15. Further, each of the electrodes 240, 245, 250, and 255 is electrically connected via leads 241, 246, 251, and 256, respectively, to the other side of electric potential source 270.

In operation, a positive potential applied to each of the four surface electrodes 240, 245, 250, and 255 relative to radial member 14 will cause rotation of rim 2 relative to central member 5 in one direction, and a negative potential applied thereto will cause rotation of rim 2 in the opposite direction. This is so since the piezoelectric elements are arranged such that a common potential applied as aforesaid will cause (i) PZTs on opposite sides of radial member 14 to react oppositely, the outer surface of one expanding while the other is contracting, and (ii) PZTs on opposite sides of the inflection point, on the same side of the radial member 14, to also react oppositely.

It should be understood that a time varying potential source 270 will cause rim 2 to oscillate relative to central member 5.

In the present invention, any one of the four PZTs may be used to provide a "pick-off" signal as an indication of flexure of radial member 14, either alone or in combination with another. Of course, in this situation, a PZT used as the means for providing the pick-off signal will not have its surface electrode connected to driving potential source 270.

Thus, in the present invention, the arrangement of PZTs as illustrated in FIG. 2 permits both driving and sensing PZTs to be employed concurrently on the same radial member. This is particularly important when both the size of the dither spring is reduced and the number of radial members is reduced.

It should be recognized to those skilled in the art that the structure of the dither spring may be provided beyond that illustrated in the drawings, and that the dither spring structure shown is only exemplary.

The embodiments of the invention in which an exclusive property or privilege are claimed are defined as follows:

1. A dither motor for a ring laser gyroscope comprising:

a spring comprised of a central member having a central axis passing therethrough, an outer rim centrally positioned about said central axis, and a plurality of flexible radial members connected between said central member and said outer rim, said radial members including first and second surfaces in parallel with said central axis;

each flexible radial member having:

a first piezoelectric element having first and second electrodes on first and second opposite surfaces, respectively, of said first piezoelectric element, and having a polarization of a first polarity defined between said first and second surfaces thereof;

a second piezoelectric element having first and second electrodes on first and second opposite surfaces, respectively, of said second piezoelectric element, and having a polarization of a first polarity defined between said first and second surfaces thereof;

a third piezoelectric element having first and second electrodes on first and second opposite surfaces, respectively, of said third piezoelectric element, and having a polarization of a first polarity defined between said first and second surfaces;

a fourth piezoelectric element having first and second electrodes on first and second opposite surfaces, respectively, of said fourth piezoelectric element, and having a polarization of a first polarity defined between said first and second surfaces;

said first piezoelectric element having its first surface rigidly fixed to said first surface of a first radial member of said plurality of radial members at a portion of said first radial member connected to said central member;

said second piezoelectric element having its second surface rigidly fixed to said second surface of said first radial member at a portion of said first radial member connected to said central member;

said third piezoelectric element having its second surface rigidly fixed to said first surface of said first radial member at a portion of said first radial member connected to said rim;

said fourth piezoelectric element having its first surface rigidly mounted on said second surface of said first radial member at a portion of said first radial member connected to said rim;

said first and third piezoelectric elements being rigidly fixed to said first surface of said first radial member on portions of said radial member opposite the point of inflection about which said rim may be rotated relative to said central member;

said second and fourth piezoelectric elements being rigidly fixed to said second surface of said first radial member on portions of said radial member which are on opposite sides of said point of inflection, and in which said second and fourth piezoelectric elements are positioned opposite said first and third piezoelectric elements, respectively; and wherein on at least one of said plurality of flexible radial members
- at least a selected one of said first, second, third, and fourth piezoelectric elements is adapted to be electrically connected to a detector for detecting a change in the piezoelectric characteristics of said selected one of said piezoelectric elements for providing an indication of the flexure of said first radial member and thereby provide an indication of the rotation of said rim relative to said central member, and
- wherein at least a selected pair of said first, second, third, and fourth piezoelectric elements which are on opposite sides of said at least one radial member and in the same proximity relative to said central member are adapted to electrically connected to an electric potential source to effect rotation of said rim relative to said central member.

2. A dither motor for a ring laser gyroscope comprising:
  a spring comprised of a central member having a central axis passing therethrough, an outer rim centrally positioned about said central axis, and a plurality of flexible radial members connected between said central member and said outer rim, said radial members including first and second surfaces in parallel with said central axis;
  each flexible radial member having:
    a first piezoelectric element having first and second opposite surfaces, of said first piezoelectric element, and having a polarization of a first polarity defined between said first and second surfaces thereof;
    a second piezoelectric element having first and second opposite surfaces, of said second piezoelectric element, and having a polarization of a first polarity defined between said first and second surfaces thereof;
    a third piezoelectric element having first and second opposite surfaces, of said third piezoelectric element, and having a polarization of a first polarity defined between said first and second surfaces;
    said first piezoelectric element having its first surface rigidly fixed to said first surface of a first radial member of said plurality of radial members at a portion of said first radial member;
    said second piezoelectric element having its second surface rigidly fixed to said second surface of said first radial member at a portion of said first radial member;
    said third piezoelectric element having its second surface rigidly fixed to said first surface of said first radial member at a position of said first radial member;
    said first and third piezoelectric elements being rigidly fixed to said first surface of said first radial member on portions of said radial member opposite the point of inflection about which said rim may be rotated relative to said central member;
  said second piezoelectric element being rigidly fixed to said second surface of said first radial member on portions of said radial member away from said point of inflection, and in which said second piezoelectric element is positioned opposite said first piezoelectric element; and wherein on at least one of said plurality of flexible radial members
- at least a selected one of said first, second, third, and fourth piezoelectric elements is adapted to be electrically connected to a detector for detecting a change in the piezoelectric characteristics of said selected one of said piezoelectric elements for providing an indication of the flexure of said first radial member and thereby provide an indication of the rotation of said rim relative to said central member, and
- wherein at least a selected pair of said first, second, third, and fourth piezoelectric elements which are on opposite sides of said at least one radial member and in the same proximity relative to said central member are adapted to electrically connected to an electric potential source to effect rotation of said rim relative to said central member.

* * * * *